(12) United States Patent
Huet et al.

(10) Patent No.: US 7,702,665 B2
(45) Date of Patent: Apr. 20, 2010

(54) METHODS AND APPARATUS FOR EVALUATING SEMANTIC PROXIMITY

(75) Inventors: Francois Huet, Santa Cruz, CA (US); Gray Salmon Norton, Portola Valley, CA (US)

(73) Assignee: Colloquis, Inc., New York, NY (US)

( * ) Notice: Subject to any disclaimer, the term of this patent is extended or adjusted under 35 U.S.C. 154(b) by 225 days.

(21) Appl. No.: 11/424,036

(22) Filed: Jun. 14, 2006

(65) Prior Publication Data

US 2006/0282257 A1  Dec. 14, 2006

Related U.S. Application Data

(60) Provisional application No. 60/690,302, filed on Jun. 14, 2005.

(51) Int. Cl.
*G06F 17/30* (2006.01)
(52) U.S. Cl. .................. 707/602; 707/708; 707/713; 707/739; 707/760

(58) Field of Classification Search ............... 707/1–4, 707/6, 100–104; 704/9
See application file for complete search history.

(56) References Cited

U.S. PATENT DOCUMENTS

| | | | | |
|---|---|---|---|---|
| 6,070,134 | A * | 5/2000 | Richardson et al. | 704/9 |
| 6,813,616 | B2 * | 11/2004 | Simpson et al. | 707/3 |
| 6,901,399 | B1 * | 5/2005 | Corston et al. | 707/6 |
| 7,302,383 | B2 * | 11/2007 | Valles | 704/9 |
| 2005/0080776 | A1 * | 4/2005 | Colledge et al. | 707/3 |
| 2006/0047632 | A1 * | 3/2006 | Zhang | 707/3 |
| 2006/0265362 | A1 * | 11/2006 | Bradford | 707/3 |

* cited by examiner

*Primary Examiner*—Cam-Linh Nguyen
(74) *Attorney, Agent, or Firm*—Vierra Magen Marcus & DeNiro LLP

(57) ABSTRACT

Methods and apparatus to evaluate the semantic proximity between reference free-form text entry and a candidate free-form text request.

7 Claims, 6 Drawing Sheets

METHODS AND APPARATUS FOR EVALUATING SEMANTIC PROXIMITY

CROSS REFERENCE TO RELATED APPLICATIONS

The present application claims the benefit of U.S. Provisional Patent Application No. 60/690,302, filed on Jun. 14, 2005, which is incorporated herein by reference.

STATEMENT REGARDING FEDERALLY SPONSORED RESEARCH

Not Applicable.

BACKGROUND

As is known in the art, conventional natural language systems that attempt to retrieve the most relevant documents from free-form, natural language queries typically rely on some type of keyword indexing in the target documents, or on some form of reference patterns (code representing one or more user inputs, with a specific syntax) associated to each target document. The keyword approach typically has trouble distinguishing relevant documents from documents that happen to share a few words with the user request. In such systems the burden is placed on the end-user to either craft a keyword query, or search through a large number of irrelevant results.

So-called reference pattern approaches can yield better results, but effective reference patterns require contributors that are well-trained in the specific syntax of the system to achieve practical results. Thus, there is a significant burden on the knowledge contributor to program for each response (a document or a scripted answer) a list of patterns accurately representing end-user requests that should trigger this response.

BRIEF DESCRIPTION OF THE DRAWINGS

The invention will be more fully understood from the following detailed description taken in conjunction with the accompanying drawings, in which.

DETAILED DESCRIPTION

In general, exemplary embodiments of the invention enable effective reference patterns to be contributed as free-form, natural language reference text entries rather than via patterns following a precise syntax, by providing an evaluation of the semantic proximity between a candidate free-form text request and a reference free-form text entry.

Figure 1:
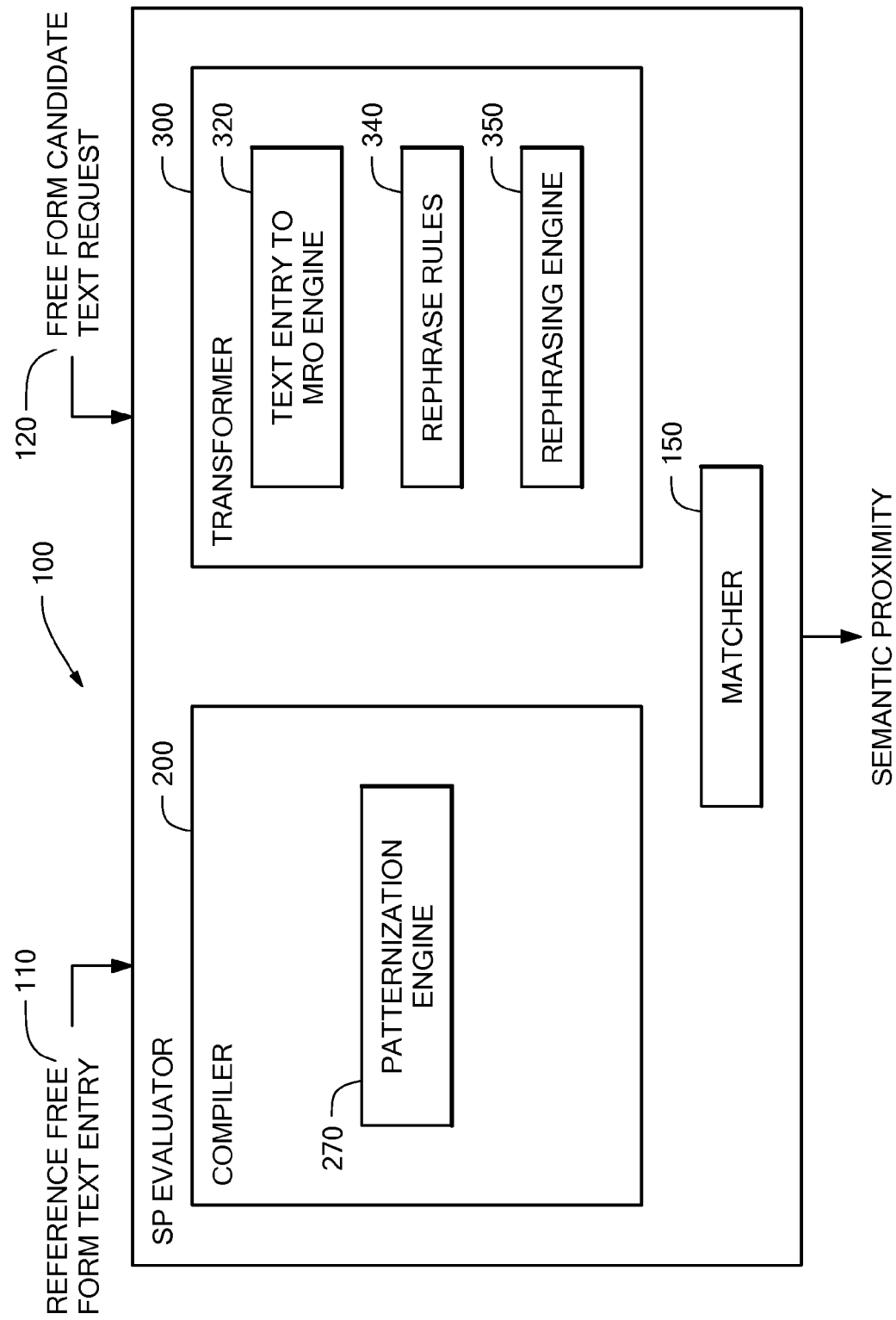
FIG. 1 is a block diagram of a system having various features of the invention.

FIG. 1 shows an exemplary embodiment of a system 100 to evaluate the semantic proximity between a reference free-form text entry and a candidate free-form text request in accordance with the exemplary embodiments of the present invention. In general, the invention system relies on a multi-step analysis of reference free-form text entries 110 and candidate free-form text requests 120.

The semantic proximity evaluator system 100 includes a compiler process 200 (FIG. 2) for compiling reference free-form text into reference patterns using a patternization engine 270 and a transformer process 300 (FIG. 1) for transforming a free-form text entry into rephrasing objects. The transformer process 300 includes a text entry to master rephrased object engine 320, a rephrase rule module 340, and a rephrasing engine 350. The system 100 further includes a matcher 150 for matching reference patterns and rephrased objects.

FIG. 1 is described in further detail in conjunction with FIGS. 1A, 2, and 3 below. FIG. 2 shows processing for the compiler process 200 for compiling reference free-form text into reference patterns. FIG. 3 shows processing for the transformer process 300 for transforming a free-form text entry into rephrasing objects.

Figure 1A:
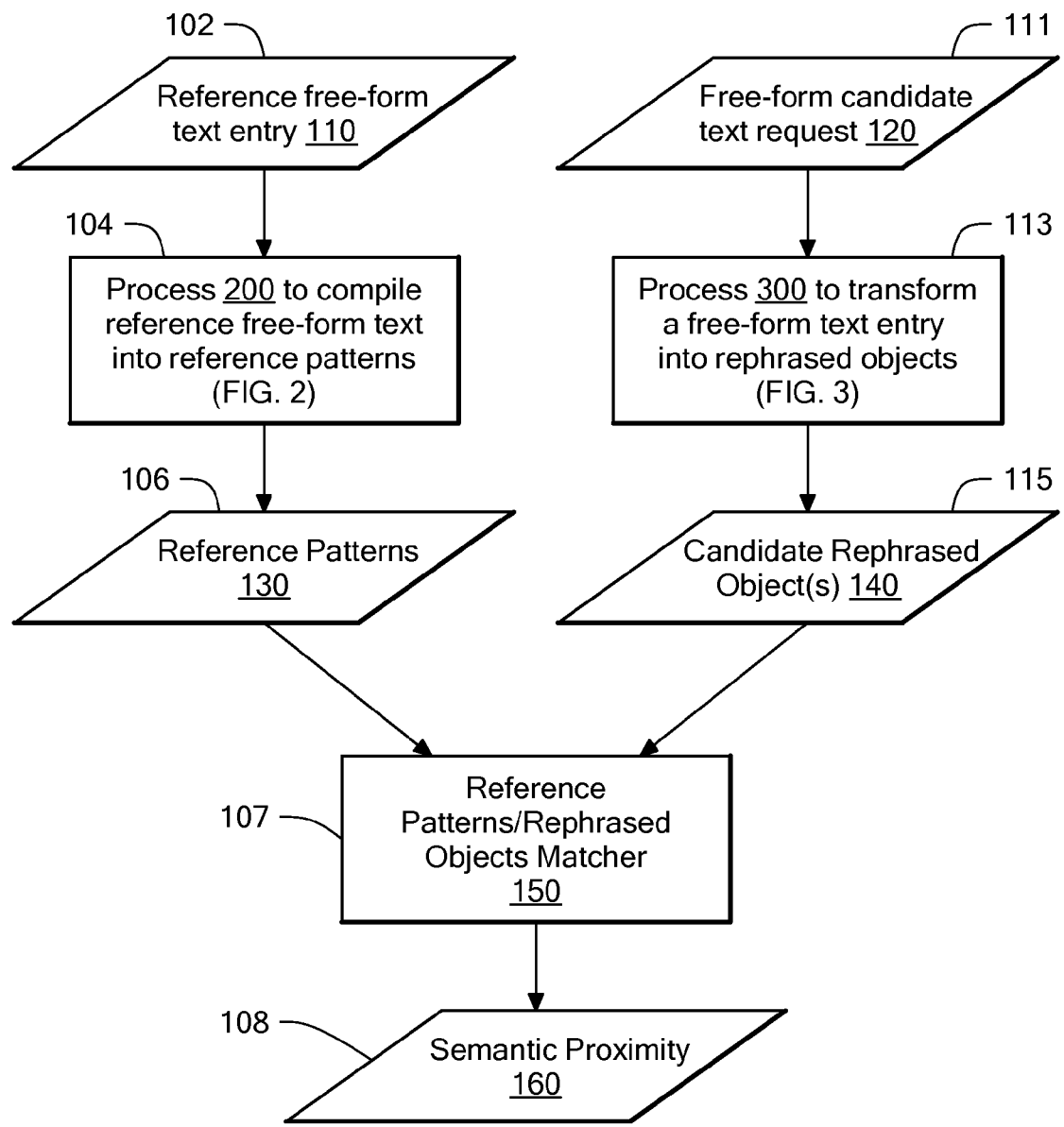
FIG. 1A is a flow diagram showing processing to evaluate the semantic proximity between a reference free-form text entry and a candidate free-form text request in accordance with one embodiment of the invention.
Figure 2:
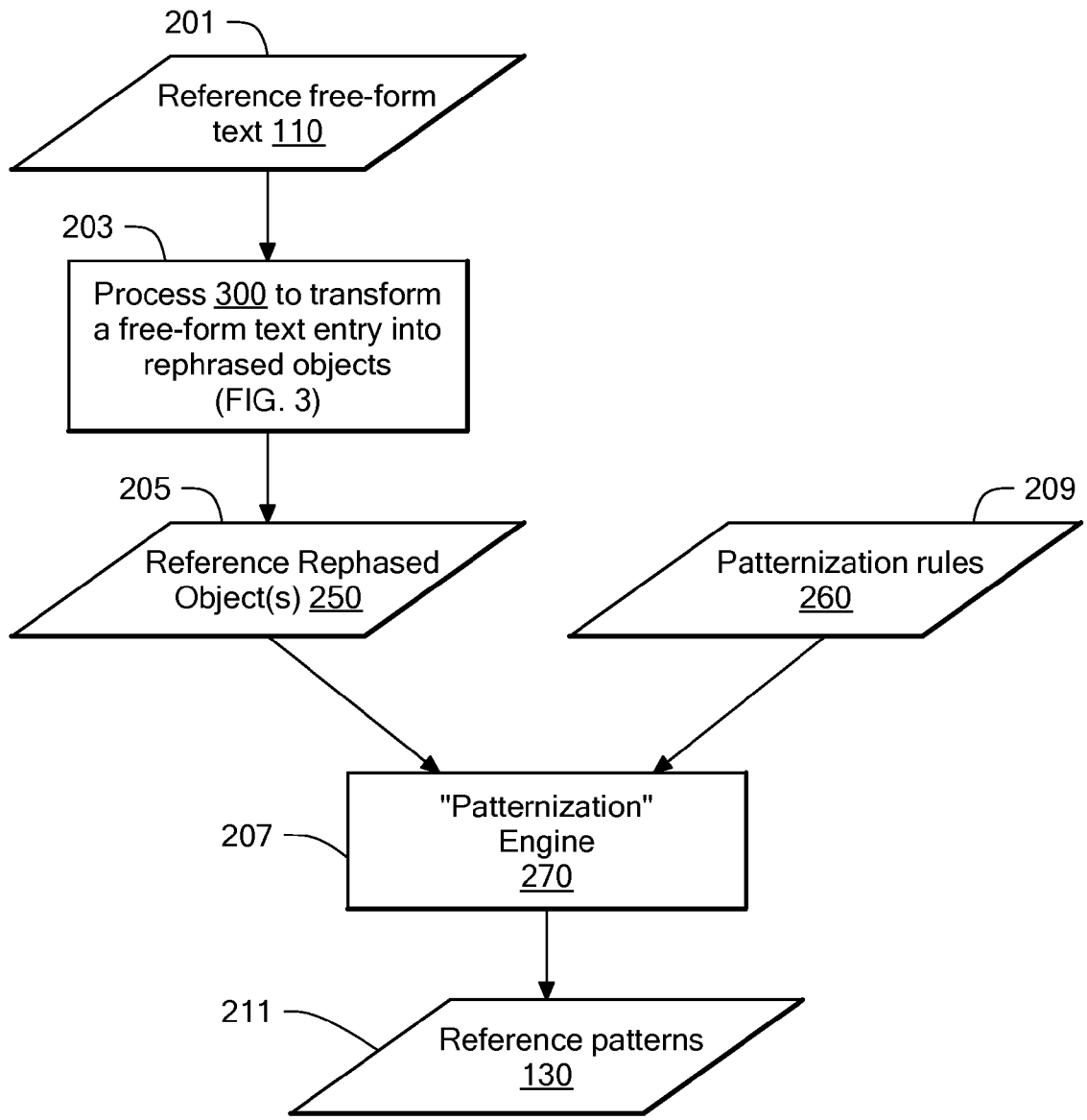
FIG. 2 is a flow diagram showing processing to compile a reference free-form text entry into reference patterns in accordance with one embodiment of the invention.
Figure 3:
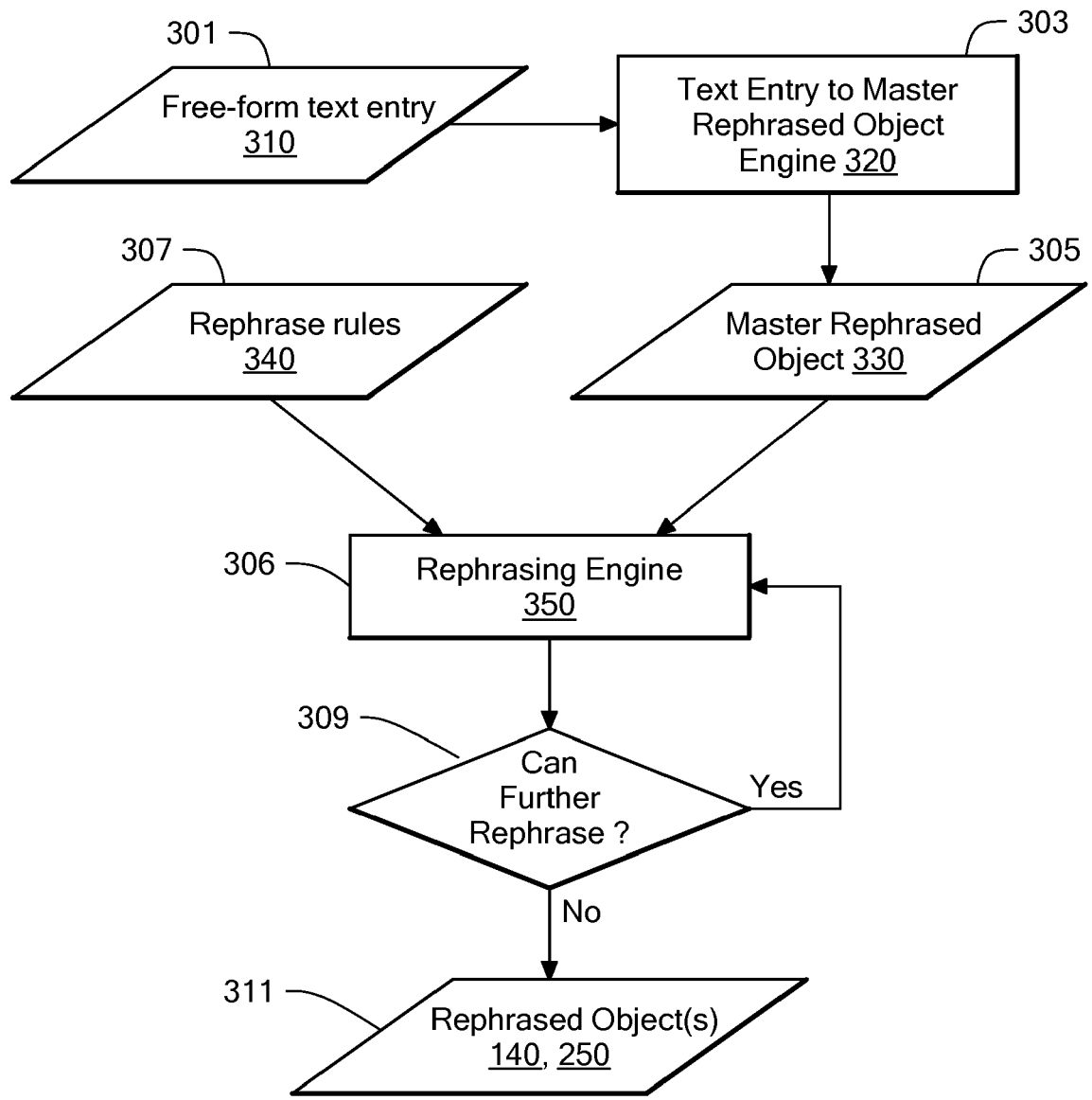
FIG. 3 is a flow diagram showing processing to transform a free-form text entry into rephased object(s) in accordance with one embodiment of the invention.

As shown in FIGS. 1A and 2, in step 102 the compiler process 200 receives the reference free form text entries 110 for compiling in step 104 to output reference patterns 130 in step 106, as described more fully in FIG. 2. In step 107, the candidate rephrased objects 140 of step 115 output in step 113 from the transformer process 300 are evaluated against the reference patterns 130 by the matcher 150 to calculate the semantic proximity 160, which is output in step 108.

The reference patterns 130 can take a variety of forms, and it should be noted that a reference rephrased object could be used directly as a reference pattern without any change depending on the matching engine implementation.

In step 111, each candidate free-form text request 120 is received and in step 113 the transformer 300 transforms the free-form candidate text requests, as described more fully in FIG. 3. In step 115, candidate rephrased objects 140 are provided from the transformer process 300. The candidate rephrased objects are then evaluated against the reference patterns 130 in step 107 by the matcher 150.

FIG. 3 shows further details of the processing by the transformer 300 to transform a free-form text entry into rephrased objects. The part of this analysis that is applied to both the reference text entries and the candidate text requests is a step of interpretation of a free-form text entry 110, 120 into a list of different representations of this text entry, called "rephrased objects".

A "rephrased object" is a data structure containing at least:

a representation of the information derived from the original free-form text request, and/or from the analysis that resulted into this rephrased object. At its simplest, this representation could be the free-form text request string itself, or a variation on it; and a representation of how different the information contained in this rephrased object is from the information contained in the original free-form text request. This representation can be an estimation of how much relevant information was lost between the original rephrased object and this one (for instance by expressing the semantic proximity as a percentage).

This Data Structure Can Also Contain Additional Information:

about the process that led to this particular rephrased object (for instance the fact that polite forms have been suppressed)

about properties of the original sentence or of the parent rephrased objects discovered through the rephrasing process (for instance the fact that the user started the sentence by stating her name, and what the name is)

external contextual information that can be relevant to the analysis of the sentence (for instance that the request comes from a Spanish speaker, and needs to be analyzed with different rules)

Example of A Data Structure that Could be Considered A "Rephrased Object":

```
{analyzed_string="I have lost my password"
proximity_to_original_rephrasing="98" name="Jane Doe"
user_is_polite="true" language="English"}
```

In step 301, a free-form text entry 310 is received and is processed by the text entry to master rephrased object engine process 320 in step 303. In step 305, the master rephrased object 330 is provided to the rephrasing engine 350 for processing performed in step 306. Rephrase rules 340 are provided in step 307 to the rephrasing engine. In step 309, it is determined whether further rephrasing can be performed and in step 311 the full list of rephrased objects (e.g., 140, 250) is output.

A rephrase rule 340 is a process which takes as a parameter at least one rephrased object, and returns zero or more rephrased objects derived from it. Each rephrase rule expresses in the resulting rephrased objects how much different the information they contain is from the information contained in their parents and/or in the original text entry. A rephrase rule can apply a variety of changes to the part of the rephrased object that represents the information derived from the original sentence, for instance:

Syntactic alterations:

```
{analyzed_string="What's the weather like?" proximity="100"}
=> {analyzed_string="What is the weather like?" proximity="100"}
```

Semantic interpretations:

```
{analyzed_string="I have lost my password." proximity="100"}
=> {analyzed_string="Give me my password." proximity="90"}
``` suppression of some parts of the request:

```
{analyzed_string="I am a current subscriber and I need to know
where I should send my check?" proximity="100"}
=> {analyzed_string="I need to know where I should send my check?"
proximity="80"}
``` conversion of some parts of the request into a different format:

```
{sentence="I am a current subscriber and I need to know where I
should send my check?" proximity="100"}
=> {analyzed_string="I need to know where I should send my check?"
user_is_subscriber="true" proximity="99"}
```

Rephrase rules 340 can take different forms and use a variety of techniques to manipulate the information contained in rephrased objects. To manipulate the information derived from the reference free-form text entry, one embodiment of the invention uses so-called regular expressions search and replacement techniques. An alternative embodiment uses a token-based parser. A variety of techniques can also be used to manipulate the information expressing in rephrased objects their semantic proximity to the master rephrased object (SP2R).

In one embodiment of the invention, each rephrase rule includes a factor expressing how much information said rephrase rule removes from source rephrased objects, and the source rephrased object SP2R is simply multiplied by this factor to calculate the destination rephrased object SP2R. In another embodiment this factor and the source rephrased object SP2R are used in combination with other parameters including how well the rephrase rule applies to this particular rephrased object to calculate the destination rephrased object SP2R. These and other techniques are well known to one of ordinary skill in the art.

In one embodiment of the invention, rephrase rules are coded using the BuddyScript scripting language. Below are example rephrase rules coded in this language. In each rephrase rule,; a pattern represents the condition for this rephrase rule to be triggered. A "score" factor is an evaluation of how much information this rephrase rule removes when applied to a rephrased object. The source rephrased object is matched against the patterns of each rephrase rule. If it matches one, the corresponding rephrase rule is triggered, and a derived sentence is generated: all of this sentence, the source rephrased object semantic proximity to the reference free-form text entry and the "score" factor are combined together to calculate a new rephrased object.

```
// Rephrases:
// {analyzed_string="What's the population of Congo" proximity="100"}
// into
// {analyzed_string="What is the population of Congo" proximity="100"}
rephrase Expand_Whats_Contraction
+ (whats|what s) WHAT=Anything {score=100}
    RES - What is WHAT
    return RES
// {analyzed_string="What is the address of your Santa Cruz branch?"
proximity="100"}
// into
// {analyzed_string="Where is your Santa Cruz branch?"
proximity="98"}
rephrase WhatIsTheAddressOf_WhereIs
+ what is the (address|location) of WHAT=Anything {score=98}
    RES - Where if(IsPlural(WHAT), "are", "is") WHAT
    return RES
// {analyzed_string="Tell me what the population of New York is."
proximity="100"}
// into
// {analyzed_string="What is the population of New York?"
proximity="98"}
rephrase TellMeAffirmation_Question
+ tell me AFFIRMATION=AnAffirmativeSentence {score=98}
    return AffirmativeToInterrogativeSentence(AFFIRMATION)
```

The Rephrasing Performed by the Rephrasing Engine Includes:

- Converting the original free-form text entry 310 into a rephrased object: the master or original rephrased object 330. This operation is performed by the text entry to master rephrased object engine 320 in step 303, which can take different forms depending on the way rephrased objects are implemented. One embodiment of the invention simply stores the text entry as a string along with a factor representing that this rephrased object didn't lose any information from the original text.
- Running the rephrasing engine process 350 on the master rephrased object 330 using a series of rephrase rules 340. This will generate a list of N additional rephrased objects.
- Running all the new rephrased objects against the rephrase rules again, and so on until no more new rephrased objects are generated or a stop condition is met.

It should be noted that, since one rephrased object can generate multiple rephrased objects, which can in turn generate more rephrased objects and so on, one request can generate a large number of rephrased objects, and some of them can differ significantly from the original sentence.

Example Treatment of One Request:

"My name is Jane Doe. Can you please help me because I have lost my password":

The request is first converted into a master rephrased object in step 330 using the text entry to main rephrased object engine in step 320. In the example and in one embodiment of the invention this would be:

```
{
    analyzed_string="My name is Jane Doe. Can you please help me because I have lost my password?"
    proximity="100"
}
```

This master rephrased object in step 330 is run against a series of rephrase rules in step 340. In the example and in one embodiment of the invention, where the proper rephrase rules are present, this new rephrased object would be generated:

```
{
    analyzed_string="Can you please help me because I have lost my password?"
    proximity="100"
    name="Jane Doe"
}
```

In this example the particular rephrase rule that was applied left the proximity unchanged, considering that no relevant information was lost in the conversion from the first rephrased object to the new one. The evaluation of the proximity factor by the rephrase rules can be adapted to reflect the specifics of the problem at hand.

The new rephrased object is run against the rephrase rules in step 340 again. It generates a third rephrased object:

```
{
    analyzed_string="I have lost my password."
    proximity="100"
    name="Jane Doe"
    user_is_polite="true"
}
```

Again the rephrase rule triggered considered no relevant information was lost between the previous rephrased object and the new one, and again this can be configured differently depending on the context. This new rephrased object, in turn, generates the following two rephrased objects in one embodiment of the invention:

```
{
    analyzed_string="Where is my password?"
    proximity="90"
    name="Jane Doe"
    user_is_polite="true"
}
and
{
    analyzed_string="I want my password."
    proximity="80"
    name="Jane Doe"
    user_is_polite="true"
}
```

The rephrase rules applied there considered that they modified the information from the rephrased object they started with, so they express this by lowering the proximity factor associated to each rephrased object, each to a different extent.

In one embodiment, of the two new rephrased objects, only the last one triggers a new one when analyzed in one embodiment of the invention:

```
{
    analyzed_string="My password."
    proximity="70"
    name="Jane Doe"
    user_is_polite="true"
}
```

Assuming no further rule could be applied, as determined in step 355, the original request would have generated six different rephrased objects.

Referring again to FIG. 2, the reference free form text entries 110 are provided in step 201 to the transformer process 300 for processing in step 203 to generate a list of reference rephrased objects 250 in step 205. In step 207, a patternization engine process 270, using patternization rules 260 provided in step 209, converts each of the generated rephrased objects into reference patterns 130 that can be output in step 211 for input to the matching process 150 of FIG. 1A. The patternization engine process 270 can take advantage of the "semantic proximity factor" associated to each rephrased object so that rephrased objects that are close to the original request are given preference (scored higher) than those that have altered it significantly.

Because both the reference rephrased objects 250 and the reference patterns can take different forms, the "patternization" engine process 270 can take different forms and use a variety of techniques, all of which use from the reference rephrased object 250 at least the representation of the information derived from the reference free-form text entry and the representation of how different the information contained in this reference rephrased object is from the information contained in the reference free-form text entry. It should be noted that the reference rephrased objects can be used "as is" as patterns if the matching engine allows for it.

In an exemplary embodiment, the reference patterns 130 derived from each reference rephrased object 250 should be able to recognize different phrasings, for instance by recognizing one word and its synonyms, or by accepting additional and or missing words in the candidate free-form text request. There are a variety of techniques to achieve this, one of which is described in the illustrative embodiment below.

In one exemplary embodiment where the rephrased object represents the information derived from the original sentence as a string (case of the example formats used above) and the pattern system itself is based on string comparison, the "patternization" engine process 270 takes the rephrased object string "as is" and creates a pattern from said string. It also applies a penalty factor to this pattern based on the information stored in the rephrased object to represent the proximity to the original string.

Example

Rephrased object={analyzed_string="My password." proximity="70" name="Jane Doe" user_is_polite="true"}
Derived "pattern" = "My password." with a score of "70"

One limitation of this method is that it doesn't allow for a lot of variety in the wording of each component of the string. It also doesn't take advantage of the rest of the information stored in the rephrased object.

As described above, the candidate free-form text request 120 (FIG. 1) is analyzed into candidate rephrased objects 140 after processing (FIG. 3) by the transformer process 300 using the rephrase rules 340 applied by the rephrasing engine 350. The rephrase rules 340 can either be the same or be different from the rephrase rules applied to the reference free-form text entries 110.

Examples

Coverage Examples

This example illustrates how the inventive method significantly increases the number of recognized user requests for each reference sentence (the coverage of each reference sentence).

Reference Question+Answer:
Q: What is the address of your offices in California?
A: Our California offices are located at 111 W Evelyn St . . .

In one embodiment of the invention, with the appropriate set of rules, the reference sentence above could be analyzed into the following set of rephrased objects, where SP2R is the semantic proximity of a rephrased object to the reference, calculated using one of the techniques described above:

| | Reference rephrased objects | |
|---|---|---|
| Reference text | Information | SP2R |
| What is the address of your offices in California? | What is the address of your offices in California? | 100 |
| | Where are your offices in California? | 98 |
| | Your offices in California. | 80 |

Those three rephrased objects would be then compiled into the pattern matching language used. The pattern matching language used can take a multitude of forms, as described above.

For the simplicity of this example, assume that the matching system used only recognizes user strings that are equal to the reference sentence; regardless of case and punctuation (no particular syntax is necessary).

At this point the system will "understand" not only the user request "What is the address of your offices in California?" (semantic proximity of 100), but also the two variations "Where are your offices in California?" (semantic proximity of 98) and "Your offices in California." (semantic proximity of 70).

The system also interprets the candidate free-form text request into rephrased objects. Looking at an example (for instance a query from an end-user) and how it is analyzed by the system, where SP2C is the semantic proximity of a rephrased object to the candidate:

| | Candidate rephrased objects | |
|---|---|---|
| Candidate text | Information | SP2C |
| I would like to know if you have offices in California? | I would like to know if you have offices in California? | 100 |
| | I want to know if you have offices in California? | 100 |
| | Tell me if you have offices in California? | 99 |
| | Do you have offices in California? | 98 |
| | Your offices in California. | 90 |

Note how the candidate text is simplified using an approach similar to the one used for the reference text. The reference sentence rephrased objects and the user request rephrased objects share one string in common ("Your offices in California."), so it is evident that even a straightforward matching system like the simplified "exact match algorithm" system will consider that the semantic proximity between the reference sentence and the user request is not null (in other word there is a "semantic match"). For each pair "reference rephrased object" (RRO)-"candidate rephrased object" (CRO), their semantic proximity will be calculated as a function of the RRO semantic proximity to the reference sentence (SP2R) and the CRO semantic proximity to the candidate sentence (SP2C). In one embodiment of the invention, this function can be a simple multiplication of the semantic proximity factors when considered as percentages. In this embodiment and for the examples considered above, the score of the match would be:

$$SP2R * SP2C = 80\% * 90\% = 72\%.$$

It is understood that a wide variety of alternative calculations can be made for the score of the match depending upon the requirements of a particular application without departing from the invention.

This example illustrates how the proposed method allows one to compare the semantic proximity of two candidate reference free-form text entries so that the most relevant answers can be precisely identified. Consider the following example reference text entries and the derived rephrased objects, as represented in one embodiment of the invention:

| ID | Reference text | Reference rephrased objects | |
|---|---|---|---|
| | | Information | SP2R |
| 1 | What is the address of your offices in California? | What is the address of your offices in California? | 100 |
| | | Where are your offices in California? | 98 |
| | | Your offices in California. | 80 |
| 2 | Do you have offices in California? | Do you have offices in California? | 100 |
| | | Your offices in California. | 92 |

Now consider a candidate text entry and its derived rephrased objects, as represented in the same embodiment of the invention:

| Candidate text | Candidate Rephrased objects | |
|---|---|---|
| | Information | SP2C |
| I would like directions to your offices in California please. | I would like directions to your offices in California | 100 |
| | I want directions to your offices in California | 100 |
| | Where are your offices in California | 98 |
| | Your offices in California. | 80 |

In the embodiment of the invention considered in the previous examples, this candidate example will match:

The reference text 1 in two different ways:

via "Where are you offices in California", with a SP of 98%*98%=96.04% via "Your offices in California", with a SP of 80%*80%=64%

The best SP is kept (96.04%)

The reference text 2:

via "Your offices in California", with a SP of 80%*92%=73.6% representing the fact that the meaning of the question "I would like directions to your offices in California please." is closer to the meaning of "What is the address of your offices in California?" than to the meaning of "Do you have offices in California?".

Let's now consider a second candidate text request:

| Candidate text | Candidate Rephrased objects | |
|---|---|---|
| | Information | SP2C |
| I want to know if you have offices in California | I want to know if you have offices in California | 100 |
| | Do you have offices in California? | 98 |
| | Your offices in California. | 80 |

This example will match:

The reference text 1:

via "Your offices in California", with a SP of 80%*80%=64%

The reference text 2 in two different ways:

via "Do you have offices in California?", with a SP of 100%*98%=98% via "Your offices in California", with a SP of 92%*80%=73.6%

The best SP is kept (98%)

This gives preference to the Reference text 2, which appropriately represents the fact that the meaning of the candidate is closer to the reference text 2 than the reference text 1.

Figure 4:
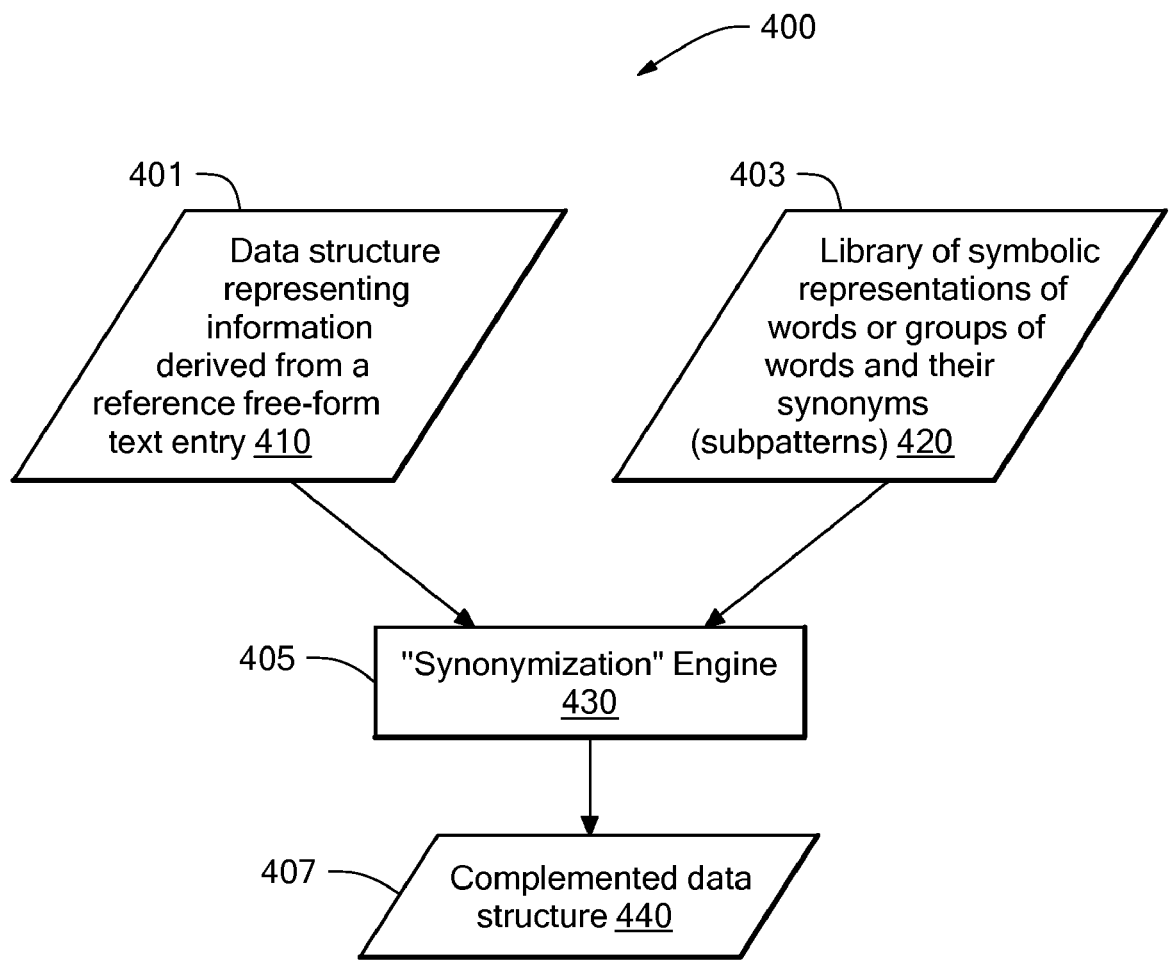
FIG. 4 is a block diagram of a system to complement a data structure representing information derived from a reference free-form text entry by using symbolic representations of synonyms (subpatterns)

FIG. 4 shows an exemplary embodiment, where the pattern system used offers a symbolic representation for synonyms, the patternization engine includes a system 400 to transform a data structure representing information derived from a free-form text entry into a pattern containing symbolic representations of synonyms (subpatterns). In this embodiment, the data structure representing information derived from a free-form text entry is the reference rephrased object itself or a data structure derived from it.

The system 400 automatically recognizes representations of words or groups of words in a data structure representing information derived from a free-form text entry 410 received in step 401 where the words or groups of words belong to a synonym set that has a symbolic representation. In step 403, a library 420 can store symbolic representations of words of groups of words and their synonyms. The symbolic representations of synonyms (subpatterns) are then combined with the data structure. The data structure 410 and library 420 information can be provided to a synonymization engine 430 for processing in step 405 to generate a complemented data structure 440 that is output in step 407.

The system allows the data structure 410 to be processed into a pattern that can be used to recognize not only the word or group of words originally found in the data structure representing information derived from a free-form text entry but also synonyms and variations of it. This process can be referred to as "synonymization".

The symbolic representations of synonyms used in the patterns are called subpatterns. A subpattern can be understood as the representation of the different ways a concept can be described via synonyms, abbreviations, etc. and includes for each variation an expression of how close it is to the original concept. This expression, the semantic proximity, is a concept similar to the semantic proximity used in rephrased objects.

In one exemplary embodiment, example subpatterns are represented using the following syntax:

```
subpattern nsChild
  + (child|kid) // <= default semantic proximity is 100
  + (son|daughter|teen) {semantic_proximity=90}
subpattern nsComputer
  + computer // <= default semantic proximity is 100
  + (pc|mac) {semantic_proximity=90}
  + machine {semantic_proximity=80}
```

References to the subpattern can then be made in a pattern, allowing the pattern to be used to recognize different variations of a concept in a data structure representing information derived from a candidate free-form text requests. In one exemplary embodiment, a reference to the subpatterns defined above is represented using the following syntax:

+my=nsChild wants a=nsComputer for christmas

Example of Coverage

In an exemplary embodiment, the matching engine will be able to match this exemplary pattern and the data structures representing information derived from such exemplary candidate free-form text requests as:

my child wants a computer for Christmas
my kid wants a computer for Christmas but also, with lesser semantic proximities:
my son wants a computer for Christmas
my child wants a PC for Christmas
my daughter wants a PC for Christmas
my teen wants a machine for Christmas
etc.

The mechanism used to transform a reference rephrased object into a pattern containing symbolic representations of synonyms (subpatterns) works by identifying in the data structure representing information derived from a free-form text entry 410 elements that could be represented as subpatterns.

This mechanism is implemented by having enough information associated to each subpattern to represent both:

the words or groups of words and the associated semantic proximities said subpattern should match on when found in the data structure derived from a candidate free-form text request the words or groups of words that should cause this subpattern to be used to build the reference pattern when found in a data structure derived from a reference free-form text entry In one embodiment, subpatterns recognize the same words or groups of words on both the reference side and the candidate side.

In an exemplary embodiment, subpattern can be made to match differently on the reference side than on the candidate side to allow for greater flexibility and precision when building the patterns. In one exemplary embodiment, this is achieved by flagging some parts of the subpattern as allowed to match on both the reference and the candidate side, or just on one of those. In one embodiment, example subpatterns using the syntax to control where a subpattern is allowed to match look like this:

```
subpattern nsChild
+ (child|kid) {candidate=yes reference=yes}// <= default semantic
proximity is 100
+ (son|daughter|teen) {candidate=yes reference=no
semantic_proximity=90}
subpattern nsComputer
+ computer {candidate=yes reference=yes}// <= default semantic
proximity is 100
+ (pc|mac) {candidate=yes reference=no semantic_proximity=90}
+ machine {candidate=yes reference=no semantic_proximity=80}
```

The subpattern "nsChild" would allow the reference sentence "Can a kid watch this movie?" to be compiled into the pattern "+can a=nsChild watch this movie". However it would not compile "Can a teen watch this movie?" into "+can a=nsChild watch this movie", because only the section (kid|child) is flagged as allowed for substitution on the reference side.

It is understood that the invention is applicable to a variety of systems having human-computer interaction. In one particular embodiment, the invention can form a part of a system having an automated or conversational agent. U.S. Pat. Nos. 6,430,602 and 6,993,555, which are incorporated herein by reference, disclose exemplary systems having automated agents that are well suited to include exemplary embodiments of the present invention.

Figure 5:
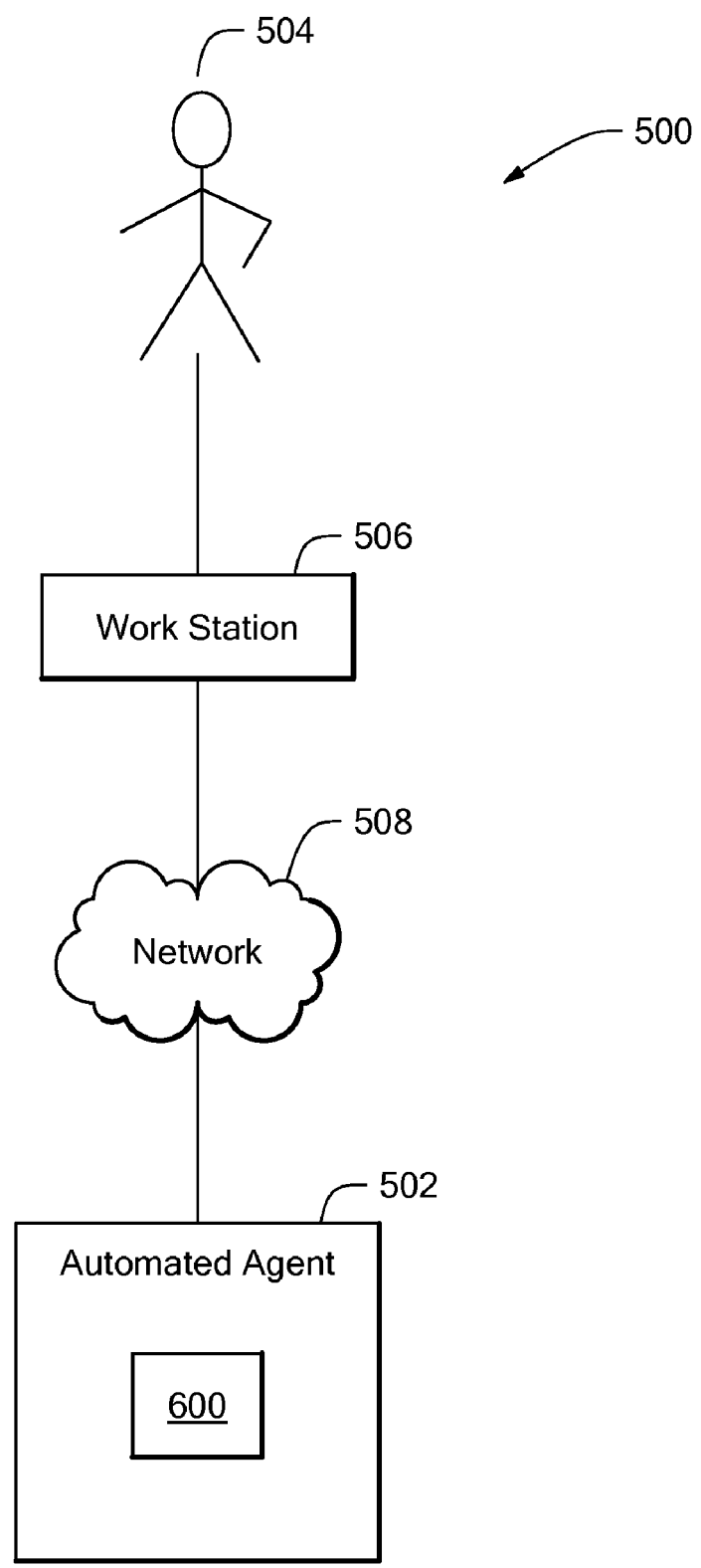
FIG. 5 is a block diagram showing an automated agent having various features of the invention.

FIG. 5 shows an exemplary system 500 including an automated agent 502 having a semantic proximity evaluator system 600, such as the system 100 of FIG. 1. A user 504 controls a workstation 506 that can interact with the automated agent 502 via a network 508, such as the Internet. The user can communicate over the network 508 via instant messaging, web browser, etc.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A computer-implemented method for evaluating a semantic proximity between a question consisting of a string of natural language text presented in a candidate free-form text request received from a user, and a reference free-form text entry consisting of a string of natural language text, comprising:

providing a plurality of reference free-form text entries in a data store, each entry in the form of a question expressed as a string of natural language text associated with an answer to the question;

receiving a candidate free-form text request from a user work station in the form of a query expressed as a string of natural language text;

processing the string of natural language text expressed in each reference free-form text entry into a plurality of reference rephrased objects, each reference rephrased object containing a variation of the string of natural language text expressed in the reference free-form text entry and an expression of the semantic proximity between the variation of the string of natural language text contained in the reference rephrased object and the string of natural language text expressed in the reference free-form text entry;

processing the string of natural language text expressed in the candidate free-form text request into a plurality of user rephrased objects, each user rephrased object containing a variation of the string of natural language text expressed in the candidate free-form text request and an expression of the semantic proximity between the variation of the string of natural language text contained in the user rephrased object and the string of natural language text expressed in the candidate free-form text request;

matching at least one of the reference rephrased objects derived from the processing of the reference free-form text entry with at least one user rephrased objects derived from the processing of the candidate free-form text request;

for each matching reference rephrased object and user rephrased object, calculating a combined semantic proximity;

selecting the reference rephrased object associated with the highest combined semantic proximity; and displaying the answer associated with the selected reference rephrased object on the user work station.

2. The method according to claim 1, wherein the reference rephrased objects and the user rephrased objects use the same data structure.

3. The method according to claim 1, wherein the processing applied to convert a reference free-form text entry into the list of reference rephrased objects is the same as the processing applied to convert a candidate free-form text request into a list of user rephrased objects.

4. The method according to claim 1, further including:
providing a reference answer to the user based on calculating the combined semantic proximity associated with each matching reference rephrased object and user rephrased object.

5. The method according to claim 1, wherein a reference rephrased object contains text, and an expression of the semantic proximity between the reference rephrased object and the information expressed in the reference free-form text entry comprises:
a percentage of how similar the text in the reference rephrased object is to the information expressed in the reference free-form text entry.

6. The method according to claim 1, wherein the expression of the semantic proximity between the variation of the string of natural language text contained in the reference rephrased object and the string of natural language text expressed in the reference free-form text entry is expressed as a percentage.

7. The method according to claim 6, wherein calculating the combined semantic proximity comprises multiplying the percentages of the matched reference rephrased object and user rephrased object.

* * * * *